United States Patent [19]

Leenhouts

[11] 4,121,144
[45] Oct. 17, 1978

[54] STEPPING MOTOR ENERGIZING CIRCUIT AND METHOD FOR MINIMIZING STEP POSITION ERROR

[75] Inventor: Albert C. Leenhouts, Harwinton, Conn.

[73] Assignee: The Superior Electric Company, Bristol, Conn.

[21] Appl. No.: 761,850

[22] Filed: Jan. 24, 1977

[51] Int. Cl.² .......................................... H02K 37/00
[52] U.S. Cl. ................................................. 318/696
[58] Field of Search ........................ 318/138, 685, 696

[56] References Cited

U.S. PATENT DOCUMENTS

| | | | |
|---|---|---|---|
| 3,599,069 | 8/1971 | Welch | 318/696 |
| 3,619,746 | 11/1971 | Thornton | 318/138 |
| 3,648,144 | 3/1972 | Rosen | 318/138 X |
| 3,769,555 | 10/1973 | Dolbachian et al. | 318/138 |
| 4,027,212 | 5/1977 | Studer | 318/138 |

Primary Examiner—Gene Z. Robinson
Attorney, Agent, or Firm—Ernest M. Junkins

[57] ABSTRACT

The ability of a stepping motor to assume the same static rotational position for each step when a step position results from simultaneous energization of two windings is enhanced by having the same quantity of current flow through both windings by always connecting in series the windings that are energized with the source of unidirectional power.

10 Claims, 5 Drawing Figures

U.S. Patent    Oct. 17, 1978    4,121,144
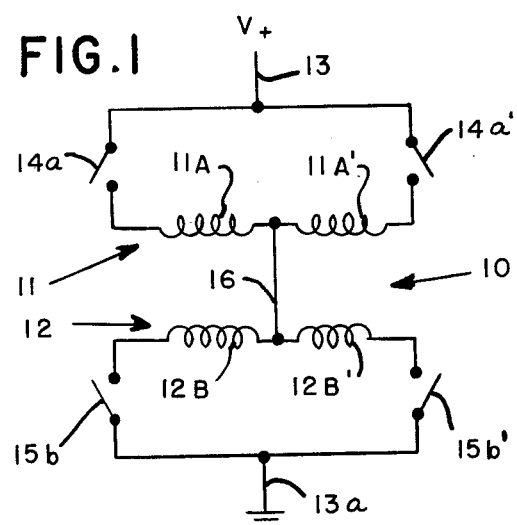
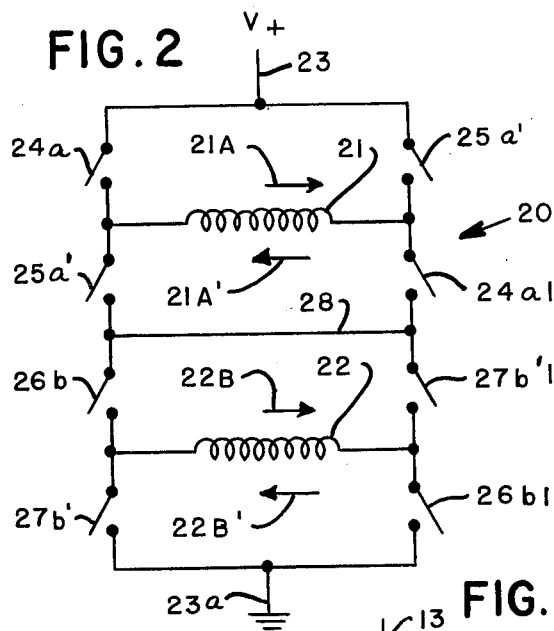
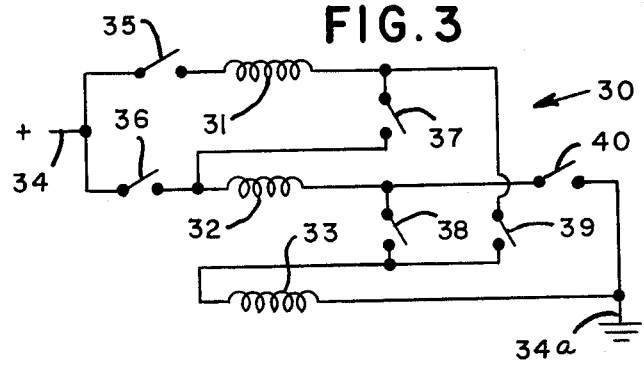
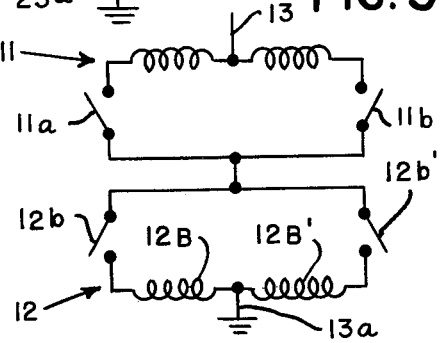
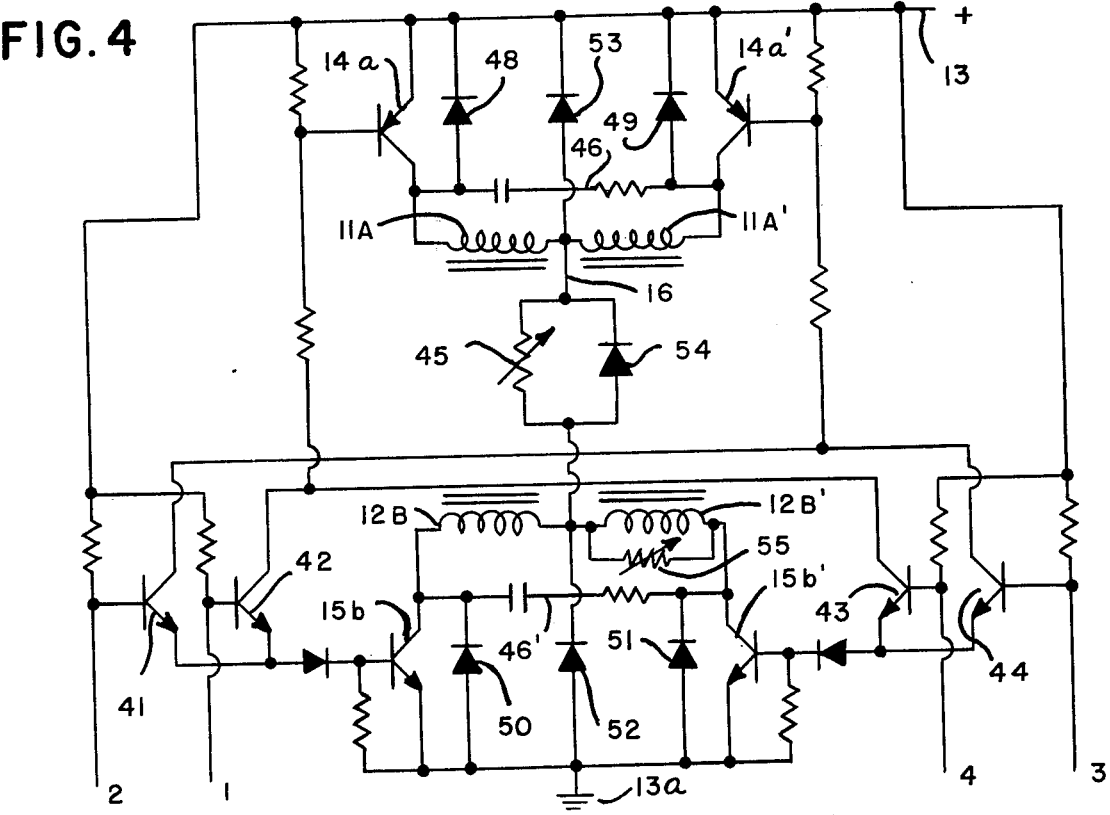

STEPPING MOTOR ENERGIZING CIRCUIT AND METHOD FOR MINIMIZING STEP POSITION ERROR

The present invention relates to stepping motors which have a plurality of steps in each revolution with the motor being capable of being stopped at most, if not at each, of the steps. Generally, such motors have a plurality of individually energizable windings with a change in the energization of a winding causing the next step to occur and with the maintenance of the same energization holding the motor at that step position. The changes of energization occur according to a sequence with usually a pair of windings being simultaneously energized for each step position and with a change for the next step position altering the energization of just one of the windings rather than both. If the motor's windings are unipolar i.e., have only one coil, the change reverses the direction of flow of the current in the coil while if the motor's windings are bifilar, i.e., have two coils, the non-energized coil is caused to be energized and the energized coil deenergized.

A description of one example of such a motor having a bifilar winding is disclosed in U.S. Pat. No. 3,117,268, assigned to the assignee of the present invention. Such a motor may have rotor and stator teeth which provide 200 equal length steps per revolution and hence each step should be equal to 1.8°. In many instances, it is required to have the motor assume and remain static at the designed step position with a tolerance of no greater than 3% of a step, both for every step in a revolution and for the same step in each revolution. Deviation in the actual step position from the designed step position is generally referred to as step position error. In each step position, a pair of windings are simultaneously energized so that both influence the step position. It has been found that, under no or light load conditions, if one winding is energized more than the other, that a step position error will occur. Further, it has been found that a 1% difference or imbalance in the current flow between the windings will produce about a 0.6% step position error on the above type motor.

As motors of the herein type require that each winding be capable of being independently energized, heretofore known circuits for controlling winding energization have connected each winding through its own switching device across a common power source. With the source of power being common to all and with the circuitry for controlling energization being composed of similarly connected identical components, an assumption that each will have the same current flow has been commonly accepted. Even with this identity of circuitry for energizing each winding, an imbalance generally ocurrs in the quantity of current flowing between the two windings because typical components of the circuitry generally are rated to have certain characteristics within a tolerance of ±10%. The magnitude of the imbalance which is not abnormally about 5%, can produce a step position error which renders the motor unacceptable for a selected use as it is outside the 3% tolerance. To overcome such unacceptable error, one attempt has involved the use of expensive power sources that precisely control current flow in each winding but this has not been found economically feasible and practical in use. Thus, which step position error is due to both impreciseness in the mechanical structure of the motor and current imbalance, the manner in which such motors have heretofore been taught to be energized has not practically eliminated the error due to current imbalance.

It is accordingly an object of the present invention to provide for the energization of a stepping motor which essentially eliminates all step position error traceable to the motor energizing circuitry with little, if any, change in the operation of the motor.

Another object of the present invention is to provide for energizing a stepping motor in which imbalance of current flow in two simultaneously energized windings is essentially eliminated even for values of current flow over a wide operating range.

A further object of the present invention is to achieve the above objects with motors that are essentially unchanged in structure and with circuits that contain essentially identical or similar components as heretofore known prior circuits.

Still another object of the present invention is to achieve the above objects with a motor energizing circuit that is as economical to produce as heretofore known circuits, which is simple in construction while being reliable even over a long period of use and which is applicable to presently existing motors and easily interconnected therewith.

In carrying out the present invention, as applied to a stepping motor such as disclosed in the above-noted patent, there are two bifilar windings that provide coils A and A' for one winding and B and B' for the other winding. The coils are energized in the sequence AB, A'B, A'B', AB', AB, etc., with each change of energization producing a step and with the motor remaining at that step while that same energization is maintained. An on-off switching device is connected between each winding and a power source and circuitry is provided for effecting a change in a sequence whenever a command for a change occurs, as by the receipt of a command pulse. In accordance with the present invention, however, each energized winding is not individually connected to the power source as heretofore known, but instead are caused to be connected simultaneously in series with each other across the power source. Thus, though there is no change in a manner in which the windings are energized, the same value of current that flows in one winding is caused to assuredly flow in the other energized winding, thereby completely eliminating step position error due to current imbalance.

Other features and advantages will hereinafter appear.

FIG. 1 is a diagrammatic illustration of the interconnections required by the present invention for a bifilar two winding stepping motor.

FIG. 2 is a view similar to FIG. 1 for a unipolar two winding stepping motor.

FIG. 3 is a view similar to FIG. 1 for a unipolar three winding stepping motor.

FIG. 4 is an electrical schematic diagram of an embodiment of a circuit for energizing the motor of FIG. 1.

FIG. 5 is a rearranged embodiment of FIG. 1.

Referring to the embodiment of the invention shown in FIG. 1, the motor 10 is a bifilar wound motor having two windings 11 and 12 with each winding having two coils 11A and 11A' and 12B and 12B'. The construction of the motor is more fully described in the above-noted patent and at each stepping position, one of the coils of each winding are energized simultaneously. For movement in one direction, the windings are energized in the sequence 11A and 12B, 11A' and 12B, 11A' and 12B', 11A and 12B', 11A and 12B, etc., while reversing the sequence produces a reverse direction of movement. While each coil is represented as a single coil, in the motor, portions thereof are located at different places as is well known in the art.

The windings are energized from a unidirectional power source having a + or positive terminal 13 and a ground or negative terminal 13a. An end of each coil 11A and 11A' is connected through on-off switches 14a and 14a', respectively, to the positive terminal 13 while an end of each of the coils 12B and 12B' are connected through on-off switches 15b and 15b', respectively, to the negative terminal 13a. The other four ends of the winding coils have a common junction as represented by a lead 16.

When the motor is initially energized according to the first energizing step in the sequence, then coils 11A and 12B are energized by the switches 14a and 15b being rendered conducting. For the next step, switch 14a is opened and switch 14a' closed, while switch 15b remains closed so that coils 11A' and 12B are energized. For the next step, switch 15b is open while switch 15b' is closed and for the final step in the sequence, switch 14a' is opened and switch 14a is closed.

The above described structure utilizes the same number of switching components and produces the same motion as in the heretofore known motor energizing circuits. The motor is constructed in the same way as disclosed in the above-noted patent with the possible exception that three lead wires must extend from the motor for each winding. However, in all of the steps of the sequence, each pair of energized windings are connected in series to have the same value of current flow through both energized windings and thus stepping position error caused by current imbalance is essentially eliminated without any change in the motor construction or its manner of operation.

In the embodiment of the invention shown in FIG. 2, a motor 20 has two unipolar windings 21 and 22 and it is required that each change of energization reverse the direction of current flow through one of the windings. The direction of current flow for winding 21 is shown by arrows 21A and 21A' and that for the winding 22 by arrows 22B and 22B' so that the motor produces steps by energizing the windings in the following sequence of current flow namely 21A and 22B, 21A' and 22B, 21A' and 22B', 21A and 22B', 21A and 22B, etc. Energization of the windings is provided from a unidirectional power source having a + or positive terminal 23 and a ground or negative terminal 23a with the various windings being connected thereto through their respective switches. For current flow 21A, switches 24a and 24a1 are provided; for current flow 21A', switches 25a' and 25a'1; for current flow 22B, switches 26b and 26b1 and for current flow 21B', switches 27b' and 27b'1. For each indicated current to flow, both of the switches associated therewith have to be closed or conducting. In addition to the above, there is further provided a connecting lead 28 which always places the two energized winding in series across the power source.

The present invention differs from the heretofore known manner of energizing unipolar two winding motors, with an example being shown in U.S. Pat. No. 3,728,598, assigned to the assignee of the present invention, by causing the connecting lead 28 to direct whatever current that flows in winding 21 to also flow in winding 22. Energization of the motor is effected by closure and opening of the switches to produce the above-noted current flows required for a sequence. It should be noted that if two adjacent switches (such as 26b and 27b') were inadvertently simultaneously closed, than a short circuit path would be formed but with the present circuit, the other winding is in series with this short circuit path and hence a short circuit across the power source does not occur. In motors connected in the heretofore known manner, a short circuit across the power source would occur with its attendent difficulties.

Shown in FIG. 3 is an embodiment of the invention incorporated into a three unipolar winding stepping motor. The motor 30 has three windings 31, 32 and 33 and current flows from left to right through each of the windings from a power source having a positive terminal 34 and a ground or negative terminal 34a. The sequence of energization for producing steps with two windings simultaneously energized requires simultaneously energizing windings 31 and 32, 32 and 33, 33 and 31, 31 and 32 etc. For controlling said energization, there is provided a plurality of switching devices 35, 36, 37, 38, 39 and 40 connected as shown. For simultaneously energizing the windings 31 and 32, switches 35, 37 and 40 are simultaneously closed; for windings 32 and 33, switches 36 and 38 are simultaneously closed and for windings 31 and 33, switches 35 and 39 are simultaneously closed. For each of the energizations for a step where two windings are simultaneously energized, the present circuit directs that the current from the positive terminal to the negative terminal pass serially through both energized windings.

In FIG. 4, the details of one form of a circuit for energizing the motor of FIG. 1 are shown and it includes the heretofore mentioned components namely windings 11A and 11A' and 12B and 12B' and switching devices (specifically transistors) 14a, 14a', 15b and 15b'. The bases of these transistors are connected as shown, to operating transistors 41, 42, 43 and 44. The bases of the operating transistors are connected to input terminals 2, 1, 4 and 3 respectively. The application of a voltage to the terminal 1 causes transistor 42 to conduct which in turn causes transistors 14a and 15b to conduct thereby energizing the winding coils 11A and 12B for the first step of the sequence. Removal of the voltage from terminal 1 and the applying of the same voltage to the terminal 2 causes transistor 41 to conduct to energize winding coils 11A' and 12B while a voltage applied solely to terminal 3 effects conduction of transistor 44 and energization of winding coils 11A' and 12B'. The same voltage applied only to terminal 4 energizes winding coils 11A and 12B' by causing conduction of transistors 14a and 15b. Thus by sequentially applying a voltage to the terminals 1, 2, 3 and 4, the motor is energized for movement in one direction. Whenever any voltage is maintained, the motor remains static at that step position as occurs with prior motor energizing circuitry.

While the winding 11 may be directly connected to the winding 12 as represented by the lead 16, it has been found preferable to include in the connection a device for controlling the quantity of current flowing through both windings. In the embodiment shown, such a device is an adjustable resistor 45 though other controlling devices may be employed, if desired. Also, the source of power may be required to have a higher voltage than in previously known circuits that energized the windings in parallel.

A change of energization may typically take place in 1 millisecond and as is well known, currents are induced in the windings where a change occurs. For accommodating such induced currents, an R-C network 46 is connected across the winding 11 and a similar R-C network 46′ across the winding 12. Further a diode is connected across the emitter-collector of each of the 5 transistors 14a, 14a′, 15b and 15b′ with the diodes for these transistors being indicated by the reference numerals 48, 49, 50 and 51 respectively. Other induced current carrying diodes include diodes 52 connected between the negative terminal 13 and the junction of coils 12B and 12B′; diode 53 connected between the junction of coils 11A and 11A′ and the positive terminal 13; and diode 54 connected between diodes 52 and 53.

When the energization of winding 12 is changed by coil 12B becoming deenergized and coil 12B′ becoming energized for the second step in the sequence, a current is induced in the coil 12B′ which is directed to the positive terminal 13 through the diodes 54 and 53 with the return being through the diode 51. The induced current diminishes and is overcome by the current flowing from the power source so that the latter current then flows normally through the conducting transistor 15b′. Also during this time of induced current flow, with no current flowing from the power source, an induced current flows through the coil 11A in a path that initially includes diode 53 and transistor 14a and then coil 11A′, diode 49 and transistor 14a. For other changes, similar paths are provided for the induced currents.

In the heretofore known circuits, the winding whose energization was not being changed, maintained it's energization and hence the magnetic flux produced thereby. In the present invention, the flux is also substantially maintained when the current from the power source is not flowing, by the flow of the induced current being in a direction that maintains the same flux.

Similar induced current protective and path producing devices are included in the other motor energizing circuits. Thus in the embodiments shown in FIGS. 2 and 3, a diode being connected across each switching transistor is basically sufficient.

In FIG. 5, there is shown a somewhat different arrangement of the switching devices in which the junction of the two windings 11 and 12 are connected directly to the two terminals 13 and 13a of the source of power and in which the switching devices 11a, 11a′, 12b and 12b′ are connected between the two windings. Induced current flow paths may be provided in the same manner as disclosed in the FIG. 4 embodiment.

If desired, current controlling devices such as the device 45, may be incorporated in the series current path of the other embodiments.

It is also contemplated that variations in motor construction may be somewhat compensated for by the use of trimming devices, such as an adjustable resistor 55 connected across the coil 12B′ in FIG. 4. A similar device may be connected across one or more of the other coils of the same motor to enable variation in coil construction that produce different impedance values for the coils to be somewhat adjusted to appear as essentially constant impedance devices, which would assure essentially constant current flow for each of the four different combinations of winding energizations.

The present invention, even though using circuit components having the usual ±10% tolerance, has been found to be capable of maintaining current imbalance to less than 0.1% with this latter minute imbalance being generally traceable to electrical leakage in the components. Such a balance accordingly reduces the not unusual step position error of ±3% due to current imbalance to less than ±0.06%. Moreover, the current balance remains, even over a wide range of current values which may even be fluctuating, without any adjustment being required in the circuit. It has further been found that even though precise positioning is obtained, the present circuit only tends to reduce somewhat the torque at the higher stepping rate but yet it appears to advantageously provide a marked reduction in mid-range resonance.

It will accordingly be understood that there has been disclosed a circuit for energizing a stepping motor in which step position error due to current imbalance is essentially eliminated without any significant change in the motor or the components required to energize the motor. The circuit causes both windings that are energized to produce each step position to have the same quantity of current flow therethrough by always connecting the two windings in series to the source of power. Even with such a series connection, induced currents may be easily accommodated and even utilized to maintain the flux that the winding whose energization is not being changed provides.

Variations and modifications may be made within the scope of the claims and portions of the improvements may be used without others.

I claim:

1. A circuit for energizing a stepping motor having a plurality of step positions and having two windings that are simultaneously maintained energized to maintain each step position with the circuit minimizing step position error caused by current imbalance in the two windings by causing the same value of current to flow in each winding comprising a source of unidirectional power, a pair of connections to each winding, means for connecting the windings in series with each other across the source of power by one of each pair of connections being connected together and switch means connected in series with the other one of the connections of each winding and the source of power, said switch means including means for changing the current flow in one winding independently of the other winding and for reversing the effective direction of current flow in either winding independently of the other winding.

2. The invention as defined in claim 1 in which each winding is bifilar being formed into two coils having a common junction forming one of the pair of connections, in which the means for connecting the windings in series connects the common junctions with the switch means to direct current through only one coil of each winding to energize each winding for each step position.

3. The invention as defined in claim 2 in which the switch means for reversing the effective direction of current flow in either one of the windings ceases the flow of current in one coil by disconnecting the one coil from the source of power and initiates the flow of current in the other coil by connecting the other coil to the source of power.

4. The invention as defined in claim 3 in which the common junctions are connected directly together.

5. The invention as defined in claim 3 in which the common junctions are connected to the source of unidirectional power.

6. The invention as defined in claim 1 in which each winding is unipolar, the ends of each winding form the pair of connections and in which the switch means for reversing the effective direction of current flow in one winding connects the one connection of the one winding to the source of unidirectional power and the other connection of the one winding serially to the one connection of the other winding.

7. The invention as defined in claim 1 in which there are adjustable impedance means connected in parallel with at least one winding for altering the effective impedance thereof.

8. The invention as defined in claim 1 in which there are adjustable means connected in series with the windings and the source of power for adjusting the value of current flowing through the windings.

9. A circuit for energizing a stepping motor having two windings that are simultaneously maintained energized to maintain a step position with the circuit minimizing step position error caused by current imbalance comprising a source of unidirectional power, a pair of connections to each end of each winding and means for connecting the windings in series with each other across the source of power with said means including switch means connected in series with at least one connection of each winding, in which the switch means includes means for changing the current flow in one winding independently of the other winding, in which both windings are unipolar and in which the switch means includes a pair of serially connected switching devices connected between in series with the one winding across the source of power whereby said one winding prevents short circuits if said pair of switching devices should become simultaneously energized.

10. A circuit for energizing a stepping motor having two windings that are simultaneously maintained energized to maintain a step position with the circuit minimizing step position error caused by current imbalance comprising a source of unidirectional power, a pair of connections to each end of each winding and means for connecting the windings in series with each other across the source of power with said means including switch means connected in series with at least one connection of each winding, in which the switch means includes means for changing the current flow in one winding independently of the other winding, in which there are means for providing a path for currents induced during a change of energization and in which said path directs current flow in the same direction as the current was flowing prior to the change.

* * * * *